United States Patent [19]

Wallace

[11] 4,403,439
[45] Sep. 13, 1983

[54] INTEGRAL FISHING ROD, HANDLE AND REEL SEAT

[76] Inventor: Leonard D. Wallace, 1 S. Strawberry St., Philadelphia, Pa. 19106

[21] Appl. No.: 253,334

[22] Filed: Apr. 13, 1981

[51] Int. Cl.³ .............................................. A01K 87/00
[52] U.S. Cl. ...................................... 43/18.1; 43/18.5; 43/23
[58] Field of Search .................... 43/18 R, 18 GF, 22, 43/23

[56] References Cited

U.S. PATENT DOCUMENTS

| | | | |
|---|---|---|---|
| 2,795,073 | 6/1957 | Gronewold | 43/23 |
| 3,034,815 | 5/1962 | McCormick | 43/18 R |
| 3,048,432 | 8/1962 | Harter | 43/18 R |
| 3,197,908 | 8/1965 | Hirsch | 43/23 |
| 3,698,118 | 10/1972 | Schultz | 43/22 |
| 4,083,141 | 4/1978 | Shedd | 43/23 |

FOREIGN PATENT DOCUMENTS 1078570 5/1963 United Kingdom .................... 43/23

Primary Examiner—Nicholas P. Godici
Assistant Examiner—Marc Hodak
Attorney, Agent, or Firm—Caesar, Rivise, Bernstein & Cohen, Ltd.

[57] ABSTRACT

An integral fishing rod, handle and reel seat assembly. The handle and reel holder is molded of nylon in situ on the distal end of an extruded fiberglass rod. The distal end of the rod extends for substantially the full length of the handle to serve as reinforcement for the handle.

5 Claims, 3 Drawing Figures

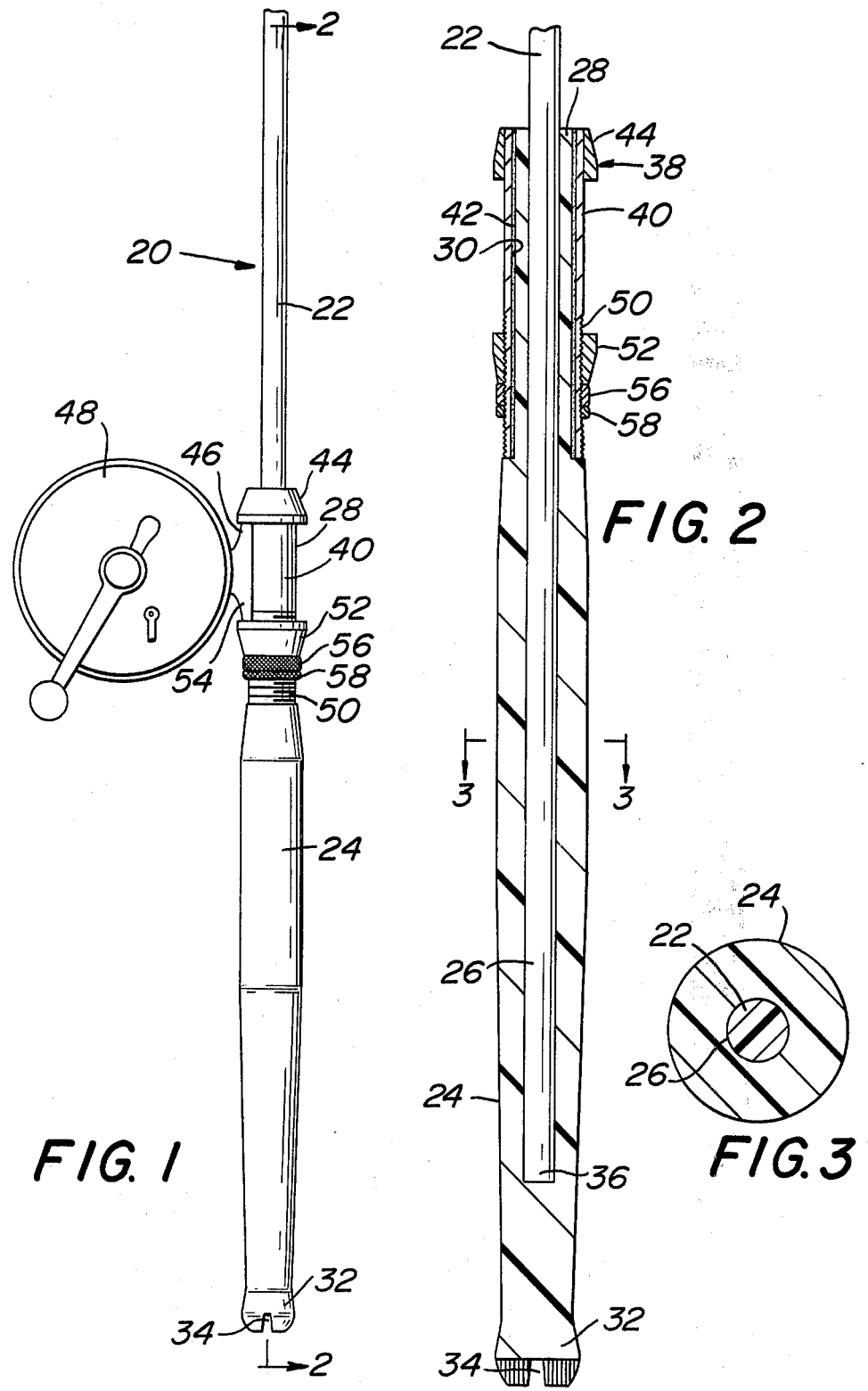

INTEGRAL FISHING ROD, HANDLE AND REEL SEAT

This invention relates generally to fishing rods and more particularly to an integrated rod, reel seat and handle assembly. Most conventional fishing rods used for deep sea sport fishing, are made of three primary sections, the rod blank, the handle or butt, and the reel seat. The end of the butt is frequently in the form of a gimbal having intersecting notches to support the rod in various positions on a rod gimbal.

High forces are frequently encountered in game fishing, which forces are transmitted through the rod to the butt assembly. With prior art rods formed of a separate blank, handle, and reel seat which are mechanically secured, e.g., glued, together the applied forces may be so great as to result in failure or breakage of the handle or butt.

Various fishing rods have been disclosed in the patent literature having integrally formed handles or butts, to overcome the tendency to break under high load conditions. For example, in U.S. Pat. No. 3,443,335, (Guydos), there is disclosed a handle, a reel seat and a gimbal butt, which are integral portions of a one-piece, elongated holder. The holder can be cast or molded from plastic or metal, such as aluminum or bronze. The reel seat is cylindrical and has a depression in it for receiving the base of a reel and an axial bore for receiving a projection of a further, separate handle arranged to be secured to the front of the reel seat. The distal end of the rod is adhesively secured within the separate handle forward of the reel seat.

In U.S. Pat. No. 4,083,141, (Shedd et al), there is disclosed an integral butt and reel seat which is made by swaging a unitary tubular member to form a rearwardly tapering butt section. A transition section is provided tapering forwardly from the butt section to a decreased diameter and a cylindrical reel seat section extends forwardly from the transition section. A reel hood is fixed to the reel seat section and the forward end of the tubular member is sealed by a plug. A forwardly projecting rib is provided to align a rod ferrule slideably received within the forward end of the integral member. The distal end of the rod is adhesively fixed within the body of the ferrule and forward of the reel seat.

While the integral handle-reel holders disclosed in the Guydos and Shedd et al patents appear suitable for their intended purposes, they may still leave something to be desired from the standpoint of the strength of the handle. In addition, the structures of said patents are relatively complex and would appear to be relatively expensive to manufacture and assemble.

Accordingly, it is a general object of the instant invention to provide an integral fishing rod and handle and reel holder which overcomes the disadvantages of the prior art.

It is a further object of the instant invention to provide an integral fishing rod, handle and reel holder which is simple in construction and low in cost.

It is still a further object of the instant invention to provide an integral fishing rod, handle and reel holder which, due to its construction, provides good resistance to breakage at the handle.

These and other objects of the instant invention are achieved by providing an integral fishing rod and handle and reel holder assembly. The pole comprises an elongated rod formed of fiberglass and having a distal end. The handle and reel holder comprises an elongated, cylindrical member molded of a plastic material and having a front end in the form of a reel seat and a rear end in the form of a gimbal butt. The rod is permanently secured to the handle by molding the handle in situ on the distal end of the rod, with the distal end of the rod extending into the handle substantially the entire length thereof to a point immediately adjacent the gimbal butt to serve as reinforcement for the handle.

Other objects and many of the attendant advantages of the instant invention will be readily appreciated when the same becomes better understood by reference to the following detailed description when considered in connection with the accompanying drawing wherein:

FIG. 1 is a side elevational view of a portion of an integral fishing rod, handle and reel holder assembly of the instant invention;

FIG. 2 is a sectional view taken along line 2—2 of FIG. 1; and

FIG. 3 is an enlarged sectional view taken along line 3—3 of FIG. 2.

Referring now to the various figures of the drawing wherein like reference characters refer to like parts, there is shown in FIG. 1 a fishing rod, handle and reel holder assembly 20 constructed in accordance with the instant invention. The assembly basically comprises an elongated rod 22 (only a portion of which is shown) and a handle reel holder 24. The rod is of conventional construction and includes a plurality of eyelets (not shown) mounted thereon at spaced locations to guide the fishing line therethrough.

In accordance with the preferred embodiment of the instant invention, the rod is formed of extruded fiberglass.

The distal end of the rod, denoted by the reference numeral 26, is permanently secured within the handle 24 and extends for substantially the full length thereof to provide additionally reinforcement for the handle, as will be described in detail later. To that end, the handle 24 is an elongated, generally cylindrical member which is molded in situ on the distal handle portion 26 of the rod. The molding of the handle in situ on the rod enables the assembly of the rod and handle to be effected easily by eliminating various assembly steps required of prior art rods and handles, thereby resulting in manufacturing economy.

The handle 24 is preferably formed of a readily moldable, yet rugged and tough plastic material, e.g., nylon. The forward end of the handle, denoted by the reference numeral 28 is in the form of an annular recess 30 extending about the periphery of the end 28 to form a reel seat. The rear end of the handle is in the form of a gimbal butt 32 having transverse slots 34.

As can be seen, the distal end 26 of the rod 22 is centered within the handle and extends down the handle for substantially the full length thereof to terminate at an end 36 closely adjacent the butt end 32.

As will be appreciated by those skilled in the art, the rod portion 26, which is located within the handle 24, being formed of extruded fiberglass, provides substantial reinforcement to the nylon material making up the handle. This feature is of considerable importance when the rod is used for large game fish or when otherwise subjected to high loads or flexing. Moreover, since the rod is secured within the handle by molding the handle on the rod in situ, assembly is expedited. This is a distinct advantage over prior art devices in which the rod is adhesively secured within the handle.

A reel holder assembly 38 in the form of a sleeve 40, preferably formed of metal, is located on the annular recess 30 and is secured in place by an adhesive, e.g., epoxy layer, 42 interposed between the inner surface of the sleeve 40 and the external periphery of the annular recess 30. At the forward end of the sleeve 40 a forward reel hood 44 is fixedly secured. The forward reel hood is of conventional construction and includes a slot (not shown) to receive a portion 46 of the base of a conventional fishing reel 48. The rear end of the sleeve 40 includes a plurality of helical threads 50. A conventional internally threaded rear reel hood 52 is threadedly engaged on the thread of the sleeve so that it can be adjusted longitudinally along the sleeve 40 by appropriate rotation to lock the reel 48 in place. To that end, the rear reel hood 52 also includes a slot (not shown) for receipt of the opposite portion 54 of the reel base. A pair of knurled locking rings 56 and 58 are also mounted on the threaded portion 50 of the sleeve to lock the hood 52 in place holding the reel 48.

It must be pointed out at this juncture that while the rod portion 22 has been described as being preferably formed of extruded fiberglass, other suitable materials can be used, e.g., graphite reinforced plastics, etc. Moreover, the handle 24 can be formed of plastics, other than nylon, which are tough yet readily moldable, such as acrylonitrile-butadiene-styrene (ABS), etc.

As will be appreciated from the foregoing, the integral fishing rod, handle and reel holder assembly of the instant invention is simple in construction and can be fabricated readily at a relatively low cost. Moreover, the extension of the distal portion of the rod within the handle for substantially the full length thereof by molding the handle in situ provides an extra measure of reinforcement to the handle, thereby resulting in an extremely rugged construction.

Without further elaboration, the foregoing will so fully illustrate my invention that others may, by applying current or future knowledge, readily adapt the same for use under various conditions of service.

What is claimed as the invention is:

1. An integral fishing rod, handle and reel seat, said rod comprising an elongated rod having a distal end, said handle and reel seat comprising an elongated one-piece cylindrical member formed of a plastic material and having a front end in the form of a reel seat and a rear end in the form of a gimbal butt, said rod being permanently secured to said handle by molding said handle and reel seat in situ on the distal end of said rod to form a solid bodied handle with the distal end of the rod extending into and secured to the handle along substantially the entire length thereof to a point immediately adjacent the gimbal butt to serve as reinforcement for the handle.

2. The integral fishing rod, handle and reel seat assembly of claim 1 wherein said rod is formed of extruded fiberglass.

3. The integral fishing rod, handle and reel seat assembly of claim 2 wherein said reel seat comprises an annular recess in the periphery of said handle contiguous with the front end thereof.

4. The integral fishing rod, handle and reel seat assembly of claim 3 wherein said reel seat additionally comprises a sleeve fixedly secured on said annular recess.

5. The integral fishing rod, handle and reel seat assembly of claim 4 wherein said reel seat sleeve is formed of metal and is adhesively secured on said annular recess.

* * * * *